(12) United States Patent
Greger et al.

(10) Patent No.: US 12,649,347 B2
(45) Date of Patent: Jun. 9, 2026

(54) METHOD FOR CONTROLLING AN ADJUSTABLE VIBRATION DAMPER

(71) Applicant: ZF Friedrichshafen AG, Friedrichshafen (DE)

(72) Inventors: Sven Greger, Bergrheinfeld (DE); Stefan Kissner, Hohenroth (DE); Mariana-Claudia Voicu, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 28 days.

(21) Appl. No.: 18/966,418

(22) Filed: Dec. 3, 2024

(65) Prior Publication Data

US 2025/0196563 A1 Jun. 19, 2025

(30) Foreign Application Priority Data

Dec. 13, 2023 (DE) ..................... 10 2023 212 599.4

(51) Int. Cl.
*B60G 17/08* (2006.01)
*B60G 17/015* (2006.01)
(Continued)

(52) U.S. Cl.
CPC ......... *B60G 17/08* (2013.01); *B60G 17/0152* (2013.01); *B60G 17/0165* (2013.01);
(Continued)

(58) Field of Classification Search
CPC ... B60G 17/0152; B60G 17/08; B60G 17/018
See application file for complete search history.

(56) References Cited

U.S. PATENT DOCUMENTS

2012/0305347 A1 12/2012 Mori et al.
2015/0224845 A1* 8/2015 Anderson ............... F03G 7/081
701/37

(Continued)

FOREIGN PATENT DOCUMENTS

DE 19546645 12/1997
DE 102009022328 6/2010
(Continued)

OTHER PUBLICATIONS

Office Action of the corresponding German Patent Application No. DE 10 2023 212 599.4, dated Aug. 9, 2024.

*Primary Examiner* — Long T Tran
(74) *Attorney, Agent, or Firm* — COZEN O'CONNOR

(57) ABSTRACT

A method for controlling an adjustable vibration damper with an adjustable damping valve and work chamber connected to a hydraulic device comprising a pump and motor. A calculated resulting vibration damper supporting force comprises a passive damping force of the adjustable damping valve and an active actuating force of the hydraulic device. Based on an actuating force requirement of a controller unit at the vibration damper, pump and valve signals are determined for the adjustable damping valve. The pump and valve signals are determined based on an actuator characteristic diagram which comprises characteristic curves for actuating flows for actuating the adjustable damping valve. A pump characteristic curve is tangential to the characteristic curves representing the actuating flows for a determination of the pump and valve signals is made via a contact point of the pump characteristic curve with a current characteristic curve in combination with the actuating force requirement.

8 Claims, 3 Drawing Sheets

(51) Int. Cl.
    *B60G 17/0165*     (2006.01)
    *B60G 17/018*      (2006.01)
    *B60G 13/08*       (2006.01)

(52) U.S. Cl.
    CPC ............ *B60G 17/018* (2013.01); *B60G 13/08*
        (2013.01); *B60G 2202/24* (2013.01); *B60G*
       *2204/62* (2013.01); *B60G 2206/41* (2013.01);
        *B60G 2500/104* (2013.01); *B60G 2500/114*
       (2013.01); *B60G 2600/182* (2013.01); *B60G*
      *2800/162* (2013.01); *B60G 2800/916* (2013.01)

(56)             References Cited

U.S. PATENT DOCUMENTS

| | | | |
|---|---|---|---|
| 2017/0320368 A1* | 11/2017 | Masamura | B60G 17/015 |
| 2017/0349022 A1 | 12/2017 | Masamura | |
| 2018/0038440 A1 | 2/2018 | Coombs et al. | |
| 2018/0264908 A1* | 9/2018 | Masamura | B60G 17/056 |
| 2018/0281550 A1* | 10/2018 | Masamura | F16F 9/466 |
| 2020/0386292 A1* | 12/2020 | Oblizajek | F16F 9/18 |
| 2021/0123496 A1* | 4/2021 | Chen | F16F 9/34 |

FOREIGN PATENT DOCUMENTS

| | | |
|---|---|---|
| DE | 102010007237 | 9/2010 |
| DE | 102018221576 | 6/2020 |
| DE | 102022212179 | 5/2024 |
| WO | WO 2010019038 | 2/2010 |

* cited by examiner

METHOD FOR CONTROLLING AN ADJUSTABLE VIBRATION DAMPER

BACKGROUND OF THE INVENTION

1. Field of the Invention

The disclosure is directed to a method for controlling an adjustable vibration damper.

2. Description of Related Art

DE 10 2018 221 576 A1 describes an adjustable vibration damper having adjustable damping valves that throttle a damping medium volume flow between two work chambers. An adjustable damping valve device is provided for every flow direction of the damping medium and every working direction of the vibration damper, respectively.

Further, the vibration damper is connected to a hydraulic device that comprises a pump with a motor. Fluidic connections between a respective work chamber and the reversible pump make it possible for the vibration damper not only to generate a passive damping force but also, as actively driven actuator, to exert an actuating force, e.g., on a vehicle body. In this way, e.g., it is possible to achieve a leveling of a vehicle body with respect to a road surface, e.g., during cornering.

Both the pump and the damping valve device are continuously adjustable. Both passive damping forces and the active actuating force are utilized for leveling.

For the simplest possible interplay of the two force components, DE 10 2018 221 576 A1 employs a controller unit 46 which has, as input quantity, a reference pressure and parameters for the pump and for the operating behavior of the vibration damper and determines a reference operating point of the pump and of the adjustable vibration damper.

A problem arises when a low-frequency actuating force must be applied, e.g., over a longer period of time, combined with the occurrence of a road excitation. An unfavorable combination of an actuating force of the pump with a damping force of the adjustable damping valve can then result in discomfort, particularly during a high-frequency excitation and, e.g., extended cornering.

SUMMARY OF THE INVENTION

An object of one aspect of the present invention is to solve the problem of discomfort.

According to one aspect of the invention a pump signal and a valve signal are determined on the basis of an actuator characteristic diagram comprising a plurality of characteristic curves for actuating flows for actuating the adjustable damping valve, and a pump characteristic curve is at least tangent to the characteristic curves representing the actuating flows such that a determination of the pump signal and valve signal is made via a point of contact of the pump characteristic curve with a flow characteristic curve in combination with the actuating force requirement.

The computational cost for determining the actuating force components from the damping force and the hydraulic device is appreciably reduced through the use of a pump characteristic curve so that the chassis can be adapted very quickly to a changed requirement. When a pump characteristic curve is used, process speed is prioritized over an optimized actuating force distribution.

With a normal pump characteristic curve, it may be assumed that when an actuating force requirement is equal to 0 N the damping force on the bottommost flow characteristic curve and the pump requirement are equal to zero, i.e., the pump characteristic curve would pass through the origin of the actuator characteristic diagram. However, it is appreciably more advantageous for the comfort behavior of a vehicle when the pump characteristic curve is employed with an offset so that the pump signal is amplified with respect to the actuating force requirement.

In a further advantageous configuration of the method, the offset is adjusted depending on at least one driving condition parameter.

In this regard, it has proven advantageous when a roadway signal representing a roadway is used as a relevant driving condition parameter for determining the offset. A roadway signal can be determined with comparatively minor expenditure by utilizing, e.g., a wheel acceleration sensor.

A linear function in the form of a straight line is preferably used for the pump characteristic curve. This results in a simple, unambiguous signal processing situation.

Aside from, or in addition to, the above-mentioned offset of the pump characteristic curve, the slope of the linear function can be adapted depending on the driving condition parameter.

Alternatively, the slope of the linear function can also be adapted such that the slope is changed over the course of the pump characteristic curve through the driving condition parameter. A straight line as pump characteristic curve, for example, then becomes, e.g., a curve comparable to a root function or square function.

BRIEF DESCRIPTION OF THE DRAWINGS

The invention will be described in more detail referring to the following description of the drawings.

The drawings show.

DETAILED DESCRIPTION OF THE PRESENTLY PREFERRED EMBODIMENTS

Figure 1:
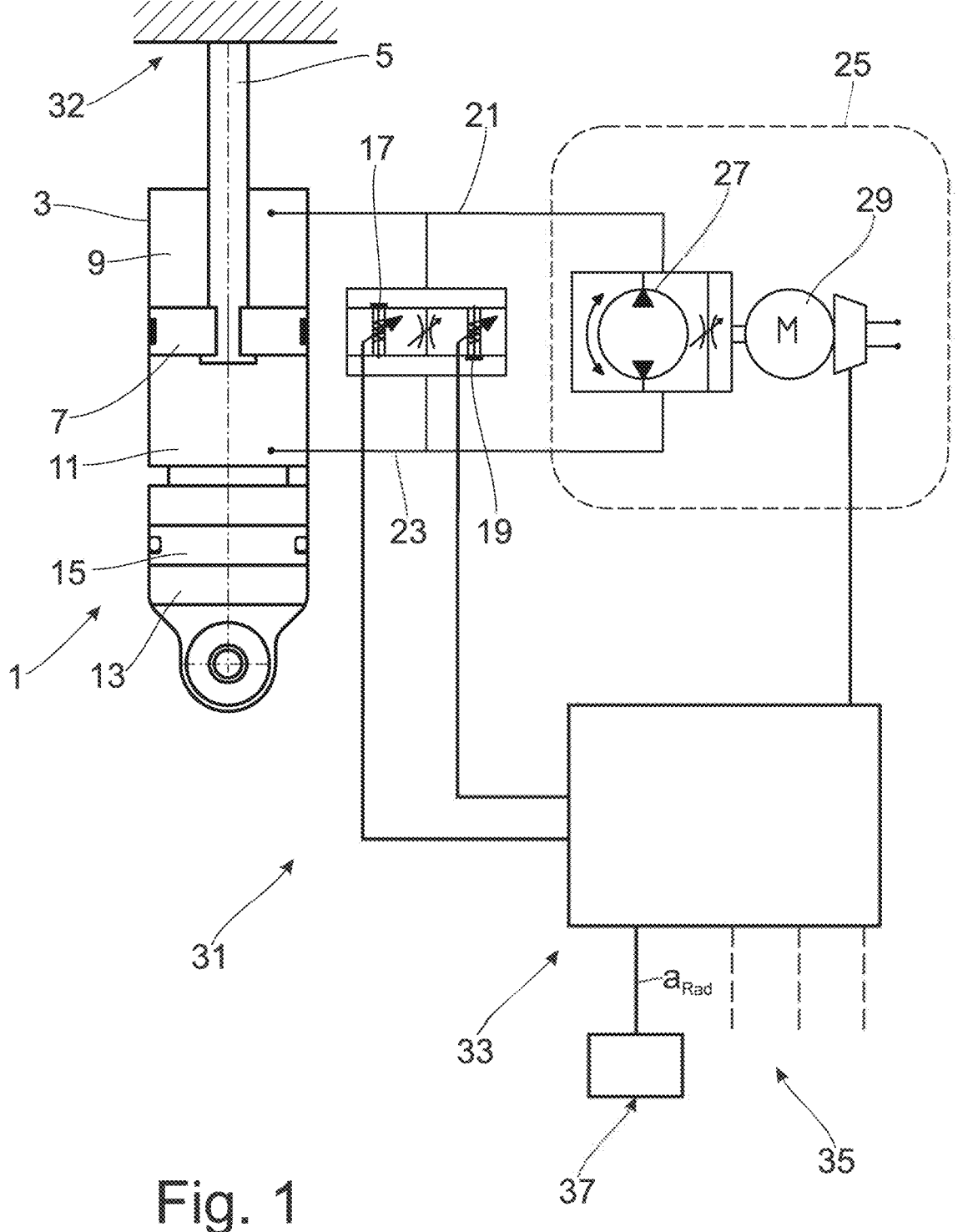
FIG. 1 is a schematic illustration of an adjustable vibration damper in combination with a hydraulic device.

FIG. 1 shows a schematic illustration of an adjustable vibration damper 1 comprising a work cylinder 3 that is filled with damping medium and in which an axially movable piston rod 5 with a piston 7 is guided. The piston 7 divides the work cylinder 3 into a work chamber 9 on the piston rod side and a work chamber 11 remote of the piston rod. A compensation space 13 is provided to compensate for the volume displaced by the piston rod 5. The compensation space 13 must in no case be arranged inside of the work cylinder 3. The invention is usable both for a monotube vibration damper and for a two-tube vibration damper, both of which are known, per se. In this example, the compensation space 13 is separated from the work chamber 11 remote of the piston rod by an axially displaceable disconnect piston 15.

The piston 7 can be outfitted as an enclosed displacer or also with any damping valve engineering or overpressure valve engineering.

Further, the vibration damper 1 comprises at least one adjustable damping valve 17; 19. In this embodiment example, there are two adjustable damping valves 17; 19, a flow passing through an adjustable damping valve in each instance in flow direction of an individual work chamber 9; 11. The adjustable damping valves 9; 11 can be connected to the work chambers 9; 11 inside of the vibration damper 1, i.e., in the piston 7, for example, outside of the work cylinder 3 or also via external fluid line 21; 23.

Hydraulically connected in parallel to the at least one adjustable damping valve 17; 19, the vibration damper 1 is connected to a hydraulic device 25 comprising at least one pump 27 with a motor 29. The pump 27 may be constructed, e.g., as a reversing pump with two pump directions. Alternatively, a pump can be used with an individual pump direction and at least one switching valve for selectively connecting the pump to one of the two work chambers 9; 11.

The combination of a vibration damper 1 and the hydraulic device 25 constitutes an actuator 31 which can exert an active actuating force, e.g., on a vehicle body 32, via the pressure force generated by the hydraulic device 25. Additionally, the passive damping force of the vibration damper 1 generated by the working movement of the vibration damper 1 and the through-flow through the adjustable damping valves 17; 19 can make use of a passive actuating force. The resulting supporting force of the actuator 31 is consequently determined by the sum of the two actuating forces.

A control device 33 is connected to the at least one adjustable damping valve 17; 19 and to the motor 29 of the pump 27. When the pump 27 can be moved itself, a control line can also lead to the pump 27. This overall configuration is preferably provided for each individual vibration damper on or in the vehicle.

The control device 33 is connected to a sensor arrangement 35 that detects at least one driving condition parameter. A sensor 37 is preferably utilized to detect a road excitation. Additional sensors may determine, e.g., the driving speed, the longitudinal acceleration and transverse acceleration or also derivatives thereof, e.g., deflection amount or deflection speed. For example, a CAN bus connection inside a vehicle can be relied on to utilize already existing signals for this application.

Figure 2:
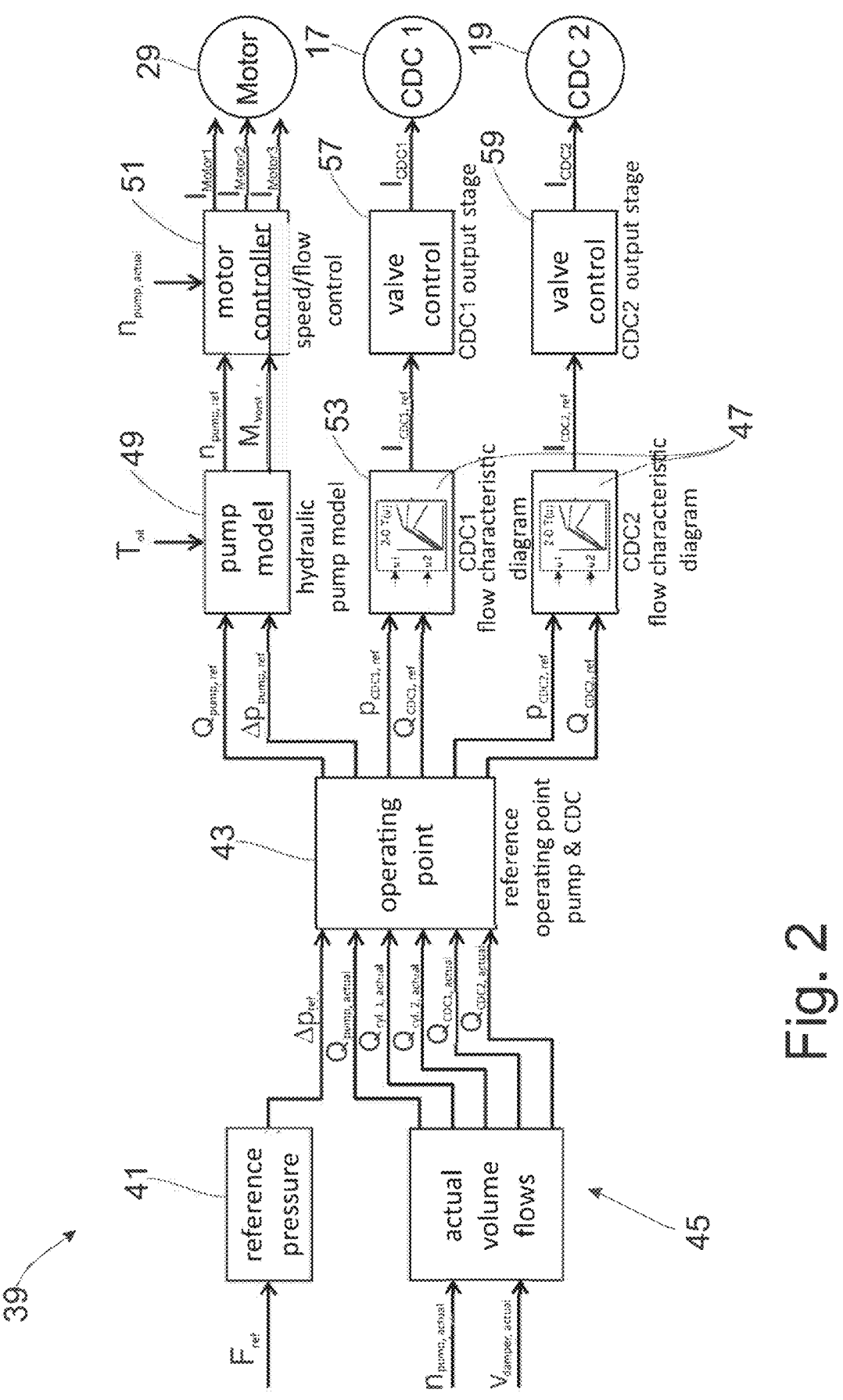
FIG. 2 is controller structure for a method for controlling a vibration damper according to FIG. 1.

FIG. 2 shows a controller structure 39 inside of the control device 33 in FIG. 1. The controller structure 39 comprises a plurality of controller units. In a first controller unit 41, a reference pressure differential $\Delta_{p\ ref}$ is calculated based on a predetermined actuating force $F_{ref}$. The parameters necessary for this, such as the pressurized surfaces in the vibration damper 1, the storage parameters and the ambient pressure, can be calculated reference pressure differential $\Delta_{p\ ref}$ between the work chambers 7; 9. This "reference pressure" output quantity of the first controller unit 41 is fed to a second controller unit 43 which gives a reference operating point for the pump 27 and the adjustable damping valves 17; 19.

A third controller unit 45 receives a rotational speed $n_{pump}$ of the pump 27 and a speed signal $v_{damp}$ of the vibration damper and, from the latter, calculates a volume flow $Q_{pump\ actual}$ and the volume flows $Q_{cyl\ 1\ actual}$, $Q_{cyl\ 2\ actual}$, $Q_{CDC\ 1\ actual}$ and $Q_{CDC\ 2\ actual}$ within the vibration damper. The parameters of the pump 27 are known so that, based on the speed of the pump 27, the instantaneous pump rate $Q_{pump\ actual}$ of the pump 27 is easy to calculate. $Q_{cyl\ 1\ actual}$ and $Q_{cyl\ 2\ actual}$ represent the volume flows in the work chambers 9; 11, and "$Q_{CDC}$" in each instance stands for a volume flow through one of the two adjustable damping valves 17; 19. These signals are also fed to the second controller unit 43.

Characteristic diagrams 47 of the adjustable valves 17; 19 are stored in the second controller unit 43. These characteristic diagrams 47 describe the functional relationship between differential pressure and actuating flow of the adjustable damping valves 17; 19 on the one hand and volume flow (X axis) and actuating force of the pump (Y axis) on the other hand.

Based on the characteristic diagrams 47 of the adjustable damping valves 17; 19 and a pump model, parameters $\Delta_{Qpump\ ref}$ and $\Delta_{ppump\ ref}$ are determined in the second controller unit 43 and fed to a fourth controller unit 49 that represents a pump model. Additionally, the signal "$T_{otl}$" which represents an oil temperature can be fed to the fourth controller unit 49. The fourth controller unit 49 sends signals $n_{pump\ ref}$ and $M_{vost}$ to a fifth controller unit 51 which receives an actual signal $n_{pump\ actual}$ via the pump speed. A motor current signal $I_{motor}$ is determined from these input signals and sent to the motor 29 of the respective pump 27. The actual motor torque can be calculated from phase currents of the pump 24, e.g., by a subsidiary motor control.

As has already been described, reference pressure values $p_{CDC1\ ref}$ and $p_{CDC2\ ref}$ and volume flow inputs $Q_{CDC1\ ref}$ and $Q_{CDC2\ ref}$ are supplied in each instance to a controller unit of the adjustable damping valve 17; 19 as sixth and seventh controller unit 53; 55. Based on the current characteristic diagrams contained therein, the adjustment of the damping valves 17; 19 is carried out in the subsequent eighth and ninth controller unit 57; 59 in that a current signal $I_{CDC1}$ and $I_{CDC2}$ is fed to the respective adjustable damping valve 17; 19.

Figure 3A:
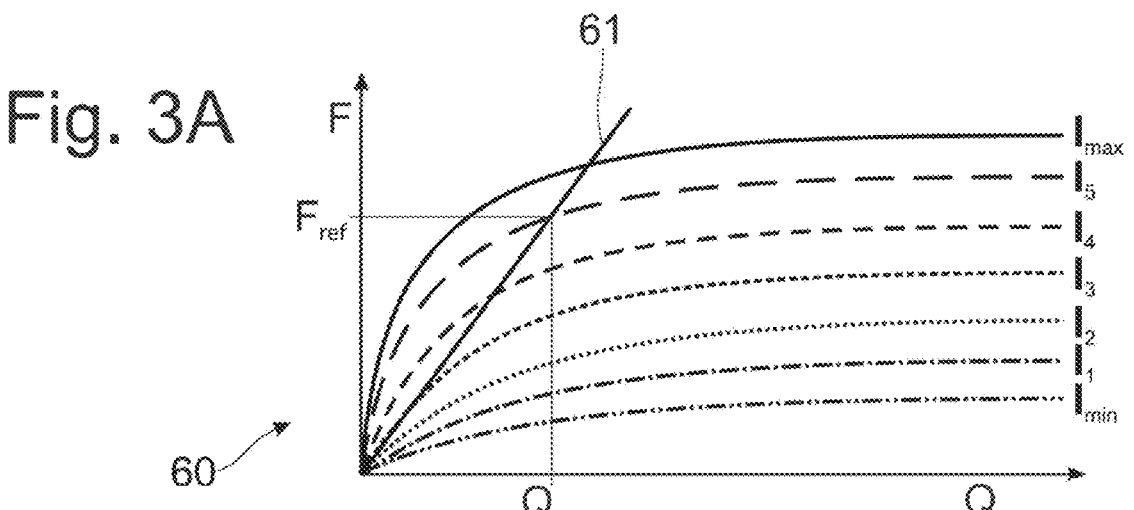
FIGS. 3A-3C are characteristic diagrams for the controller structure according to FIG. 2.

The resulting actuating force comprised of passive damping force and active pumping force 27 and is compulsorily equal to zero when the pump 27 and the vibration damper 1 are stopped, as is shown by an actuator characteristic diagram 60 according to FIG. 3, is considered for controlling the actuator 31. Consequently, the relevant characteristic curves for the adjustable damping valves 17; 19 as well as a pump characteristic curve 61 start at the origin of the characteristic diagram considered in a simplified manner. The damping valve characteristic curves show a damping force FD depending on a current intensity $I_{(X)}$. There is practically an infinite number of combinations of pump settings and damping valve settings available for a desired actuating force. The pump characteristic curve 61 is selected with respect to shape such that it is at least tangent to, better yet intersects, the characteristic curves I(X) of the pump characteristic curve 61 which represent the actuating flows. A determination of the pump signal $Q_{pump\ ref}$ and of the valve signal I(X) is made via a point of contact of the pump characteristic curve 61 with a flow characteristic curve in combination with the actuating force requirement F. This setting of the basic parameters for the adjustable damping valves 17; 19 and for the pump 27 can be carried out very quickly.

Given an ideally level road, it would be possible, e.g., to adjust a large damping force, i.e., large passive supporting force, and to adjust a comparatively small volume flow of the pump. An ideally level road would also not display any disadvantages with respect to comfort in case of a hard damping force setting because no excitation occurs. The supporting force would then be a predominantly passive damping force, e.g., for suppressing a rolling motion during cornering. This setting would also be very advantageous with regard to energy use.

Even a small excitation of the chassis and a resulting change in the actuating force F results in the operating point migrating into the steeply dropping characteristic curve range. This operating behavior manifests itself as a loss of comfort. An excitation of the chassis is always connected to a working movement of the vibration damper and, consequently, to a change in the volume of the work chambers 9;

11. This change in the work volume $\Delta V$ must be compensated by the pump 27 with a $\Delta Q$ in order to generate a pump-side actuating force. If this actuating force F is not maintained on the pump side, the system reaches the area of the dropping characteristic curve of the adjustable damping valves 17; 19 and the above-mentioned disadvantage with respect to comfort.

Figure 3B:
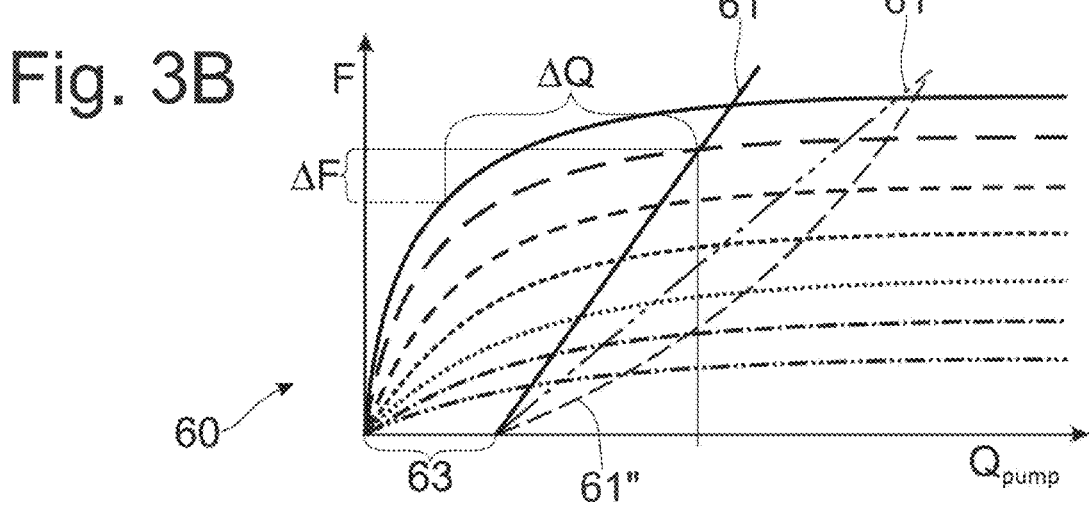
Figure 3C:
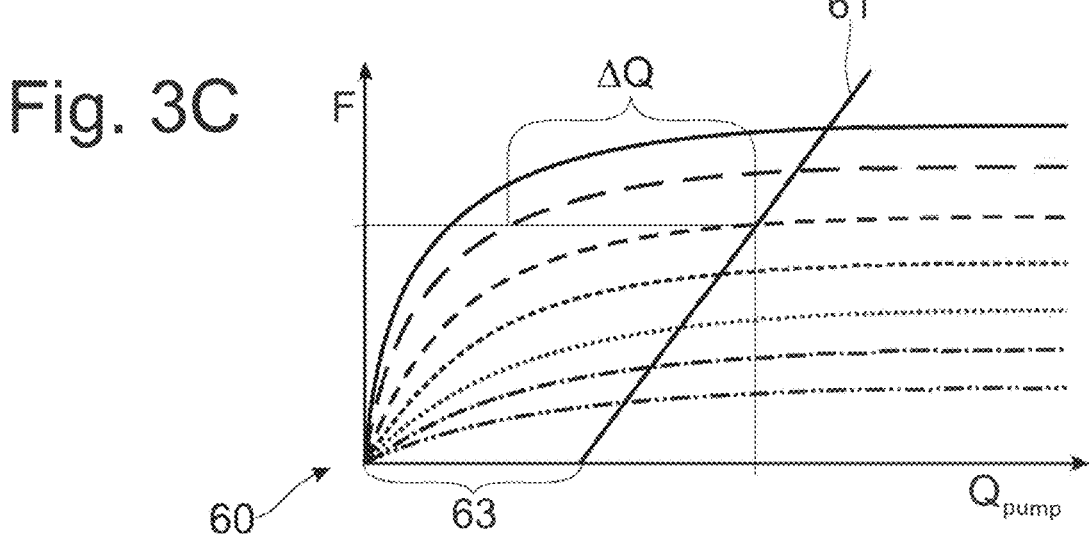

In order to minimize the effect of the fluctuating actuating forces, the pump characteristic curve 61 is used with an offset 63, as a result of which the pump signal is strengthened with respect to the actuating force requirement F. In FIG. 3B, the offset 63 tends to be selected on the low side in order to optimize pump operation. FIG. 3C shows that, with a greater offset 63 of the pump characteristic curve 61 with respect to the origin of the characteristic diagram, a larger excitation, same magnitude $\Delta Q$, has no noticeable effect on the actuating force. A constant actuating force F then signifies no force jumps which would reduce comfort for passengers in the vehicle.

As has already been mentioned, greater pump work is always bound with higher energy use. A smaller offset 63 is worth the effort for this goal. Therefore, the offset 63 is adjusted depending on at least one driving condition parameter. A roadway signal representing a roadway is used as a relevant driving condition parameter for determining the offset 63. For example, a wheel acceleration signal $a_{wheel}$ of the wheel-side acceleration sensor 37 can be used. Of course, a displacement signal or speed signal of a spring-loaded wheel and a temporal deviation could also be used as signal.

In the simplest form, a linear function in the form of a straight line is used for the pump characteristic curve 61. This pump characteristic curve 61 can not only be displaced in parallel with the offset 63 as is shown by FIGS. 3B and 3C, but the slope of the pump characteristic curve 61 can also be changed depending on the driving condition parameter-see pump characteristic curve 61'. The change can also vary within the pump characteristic curve 61" so that the shape of the pump characteristic curve is changed by the driving condition parameter.

Thus, while there have shown and described and pointed out fundamental novel features of the invention as applied to a preferred aspect thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for controlling an adjustable vibration damper that has at least one adjustable damping valve and at least one work chamber connected to a hydraulic device, which comprises a pump with a motor, comprising:

calculating a resulting supporting force F of the vibration damper that comprises a passive damping force of the at least one adjustable damping valve and an active actuating force of the hydraulic device; and determining a pump signal and a valve signal for the at least one adjustable damping valve based on an actuating force requirement of a controller unit at the vibration damper;

wherein the pump signal and the valve signal are determined based on an actuator characteristic diagram which comprises a plurality of characteristic curves for actuating flows $I_{(X)}$ for actuating the adjustable damping valve, and wherein a pump characteristic curve is at least tangential to the characteristic curves representing the actuating flows $I_{(X)}$ so that a determination of the pump signal and of the valve signal is made via a point of contact of the pump characteristic curve with a current characteristic curve in combination with the actuating force requirement.

2. The method according to claim 1, wherein the pump characteristic curve is used with an offset, as a result of which the pump signal is strengthened relative to the actuating force requirement.

3. The method according to claim 2, wherein the offset is adjusted depending on at least one driving condition parameter.

4. The method according to claim 3, wherein a roadway signal $a_{wheel}$ is used as a relevant driving condition parameter for determining the offset.

5. The method according to claim 3, wherein a shape of the pump characteristic curve is changed by the at least one driving condition parameter.

6. The method according to claim 1, wherein a linear function in a form of a straight line is used for the pump characteristic curve.

7. The method according to claim 6, wherein a slope of the linear function is adapted depending on at least one driving condition parameter.

8. A vibration damper, comprising:

at least one adjustable damping valve; and at least one work chamber connected to a hydraulic device, which comprises a pump with a motor, wherein the vibration damper is controlled by:

calculating a resulting supporting force F of the vibration damper that comprises a passive damping force of the at least one adjustable damping valve and an active actuating force of the hydraulic device; and determining a pump signal and a valve signal for the at least one adjustable damping valve based on an actuating force requirement of a controller unit at the vibration damper;

wherein the pump signal and the valve signal are determined based on an actuator characteristic diagram which comprises a plurality of characteristic curves for actuating flows $I_{(X)}$ for actuating the adjustable damping valve, and wherein a pump characteristic curve is at least tangential to the characteristic curves representing the actuating flows $I_{(X)}$ so that a determination of the pump signal and of the valve signal is made via a point of contact of the pump characteristic curve with a current characteristic curve in combination with the actuating force requirement.

* * * * *